(12) United States Patent
Van Rossum et al.

(10) Patent No.: US 7,716,872 B2
(45) Date of Patent: May 18, 2010

(54) REMOVABLE PROTECTIVE COATING

(75) Inventors: Antoon Johannes Gerardus Van Rossum, Berkel-Enschot (NL); Antonius Franciscus Maria Bertels, Oisterwijk (NL)

(73) Assignee: RSB Laboratorium B.V., Nassau (NL)

( * ) Notice: Subject to any disclaimer, the term of this patent is extended or adjusted under 35 U.S.C. 154(b) by 541 days.

(21) Appl. No.: 10/815,942

(22) Filed: Apr. 2, 2004

(65) Prior Publication Data

US 2004/0197586 A1    Oct. 7, 2004

Related U.S. Application Data

(63) Continuation of application No. 09/508,852, filed on Jun. 2, 2000, now abandoned, which is a continuation of application No. PCT/NL98/00634, filed on Nov. 3, 1998.

(30) Foreign Application Priority Data

Nov. 3, 1997    (NL)    .................................. 1007433

(51) Int. Cl.
    *A01G 13/02*    (2006.01)
    *B32B 17/06*    (2006.01)
    *B32B 17/10*    (2006.01)

(52) U.S. Cl. ............................. 47/17; 47/20.1; 47/29.1; 428/426; 428/441; 428/442

(58) Field of Classification Search ................. 526/319, 526/321, 320
See application file for complete search history.

(56) References Cited

U.S. PATENT DOCUMENTS

| | | | | |
|---|---|---|---|---|
| 3,914,469 | A | | 10/1975 | Delano et al. ................ 427/164 |
| 4,409,266 | A | * | 10/1983 | Wieczorrek et al. .......... 427/302 |
| 5,035,980 | A | | 7/1991 | Nebe et al. ................... 430/281 |
| 5,061,518 | A | | 10/1991 | Langerbeins et al. |
| 5,270,414 | A | | 12/1993 | Saito et al. |
| 5,519,964 | A | * | 5/1996 | Kujirai et al. ................... 47/17 |
| 5,527,619 | A | | 6/1996 | Rokowski et al. ............ 428/452 |
| 5,574,117 | A | * | 11/1996 | Yoshida et al. ............... 526/224 |
| 5,597,788 | A | | 1/1997 | Stevens |
| 6,001,533 | A | | 12/1999 | Sega et al. ................. 430/270.1 |
| 6,218,074 | B1 | | 4/2001 | Dueber et al. |
| 6,348,432 | B1 | | 2/2002 | Elmasry |

FOREIGN PATENT DOCUMENTS

| | | |
|---|---|---|
| EP | 0 162 611 | 11/1985 |
| EP | 0428937 | 5/1991 |
| EP | 421250 | 4/1992 |
| EP | 0478067 | 4/1992 |
| EP | 0533367 | 3/1993 |
| EP | 0578498 | 1/1994 |
| EP | 9300675 | 11/1994 |
| EP | 0 739 912 | 10/1996 |
| GB | 2 158 831 | 11/1985 |
| GB | 2231876 | 1/1990 |
| JP | 60-255865 | 12/1960 |
| JP | 51-127181 | * 5/1976 |
| JP | 62-070461 | 3/1987 |
| JP | 62-253673 | 11/1987 |
| JP | 03-064305 | 3/1991 |
| JP | 03-205461 | 9/1991 |
| JP | 04-080271 | 3/1992 |
| JP | 04-325582 | 11/1992 |
| JP | 05-059309 | 3/1993 |
| JP | 5-170941 | * 9/1993 |
| JP | 05-263027 | 10/1993 |
| JP | 06-049131 | 2/1994 |
| JP | 06-107984 | 4/1994 |
| JP | 06-234912 | 8/1994 |
| JP | 06-248206 | 9/1994 |
| JP | 07-148459 | 6/1995 |
| JP | 07-207146 | 8/1995 |
| JP | 08-186005 | 7/1996 |
| JP | 09-048825 | 2/1997 |
| JP | 09-059539 | 4/1997 |
| JP | 09-151341 | 10/1997 |
| JP | 10-090510 | 4/1998 |
| JP | 10-090511 | 4/1998 |
| JP | 10-090512 | 4/1998 |
| JP | 10-133365 | 5/1998 |
| NL | EP0478067 B1 | * 1/1992 |

OTHER PUBLICATIONS

Translation for JP 51127181.*
Translation for JP 51127181. Nov. 5, 1976.*

* cited by examiner

*Primary Examiner*—Michael Cleveland
*Assistant Examiner*—Nicole Blan

(57) ABSTRACT

A greenhouse comprising: a substantially transparent surface; a protective coating comprising a pigment and a binder. The binder comprises a vinyl polymer based on one or more of the monomers selected from the group consisting of methyl methacrylate, butyl acrylate, 2-ethylhexyl acrylate, ethyl acrylate, styrene, methacrylic acid and acrylic acid, having a weight-average molecular weight of 10,000-100,000 and an acid value of 40-250. The binder has a polydispersity of 2-6 and a glass transition temperature of 10 to 60° C. The protective coating is on said substantially transparent surface and the protective coating is removable with a removing agent comprising a base and a complex former.

13 Claims, No Drawings

REMOVABLE PROTECTIVE COATING

This application is a continuation of Ser. No. 09/508,852 filed Jun. 2, 2000 now abandoned, which is a continuation of PCT/NL98/00634, filed Nov. 3, 1998 in English, which claims priority to NL 1007433 filed Nov. 3, 1997.

This invention relates to a removable protective coating, and to a protective agent and a method for forming such coating.

In horticulture, many plants are grown in greenhouses. Thus, they can benefit from optimized conditions, such as temperature, amount of light, humidity and the like. However, a problem here is that the plants being grown are exposed, under warm, sunny weather conditions, to a large amount of radiation, which might disturb the living conditions and growth of the plants, and might even cause them to burn. To obviate this problem, it is customary in horticulture to protect the plants during the spring and the summer against the adverse effect of undue radiation by providing the transparent surfaces of the greenhouse with a protective coating.

One of the chief requirements to be met by such a protective coating is that sufficient protection from light and heat is achieved. To meet this requirement, the protective coating should contain a pigment, such as chalk or titanium oxide. A further important requirement is that the protective agent from which the protective coating is formed exhibits sufficient adhesion to the surface of a greenhouse. When its adhesive strength is too low, the coating will not be resistant to weather influences and it will be necessary to restore the coating several times per season or to replace it. When adhesion is too strong, it requires much effort to remove the coating at the end of the season.

In European patent application 0 428 937, it is proposed to use a protective agent based on a polymeric binder and pigments, such as aluminum pigments, titanium pigments or calcium carbonate. No particular requirements are set with regard to the nature of the polymeric binder.

In practice, it has been found that many polymeric binders impart too high an adhesive strength to the protective agent. This makes it particularly labor-intensive to remove the protective coating at the end of the season and/or requires the use of aggressive chemicals; which is undesirable on the ground of health and environmental considerations.

European patent application 0 478 067 discloses a method for applying a protective coating to a greenhouse, which coating provides protection against solar radiation. A thin layer of a protective agent is applied to a surface, and after a chemical conversion, a stable coating is obtained. To remove the coating at the end of the season, the coating is treated with a stripping agent, which removes the stability and the water-resistance of the coating. The surface can subsequently be easily cleaned by rinsing with water.

The protective agent used according to this European patent application is based on an inorganic pigment and a polymeric binder. The single example shows the use of calcium carbonate as pigment and a partially esterified copolymer of styrene and maleic acid anhydride as binder.

A protective coating formed from the agent described in EP-A-0 478 067 proves to be insufficiently resistant to weather influences. Such a coating must be frequently restored or even be re-applied several times in the course of one season. It is assumed that the instability of the coating is due to degradation of the polymer chains of the binder by, for instance, UV radiation. This degradation shortens the chains of the binder, thereby reducing the adhesive strength of the protective coating. The adverse effect of degradation of the polymer chains of the binder is all the greater in the above-mentioned copolymer of styrene and maleic acid anhydride because the chains of that polymer are already short as it is.

European patent application 0 533 367 discloses a coating based on a copolymer of an α,β-ethylenically unsaturated carboxylic acid, another α,β-ethylenically unsaturated monomer and an amphiphilic monomer. In the examples of the application, the coating described was tested on steel plates. The properties that are deemed to be relevant are drying time, resistance to acid rain and to S rust of metallic powders, and removability by an aqueous, basic solution.

European patent application 0 578 498 relates to a specific acrylic polymer of improved heat resistance and processability. The polymer has a number-average molecular weight of 1,000 to 1,000,000, a glass transition temperature of −80° C. or higher, and a molecular weight distribution of 5 or less. The intended uses of the polymer are inter alia acrylic rubbers, pressure-sensitive adhesives, dispersants, additives to asphalt, coatings, fiber processing agents, and improvers for resins and water inks.

It is an object of the present invention to provide a protective coating which affords protection against (solar) radiation and has an adhesive strength such that the above-described disadvantages from the prior art do not occur. What is further contemplated is that the protective coating can be easily removed at the moment when it is no longer desired.

It has been found that these objects are achieved when a protective coating is formed from a protective agent which comprises a pigment and a specific binder. Accordingly, the invention relates to a protective coating which is removable with a removing agent comprising a strong base and a complex former, which protective coating comprises a pigment and a binder, the binder being a polymer having a weight-average molecular weight of 10,000-100,000 and an acid value of 40-250.

Surprisingly, a protective coating according the invention has been found to have excellent adhesive power. The coating is sufficiently stable to afford prolonged protection against radiation, without requiring interim repair. Further, the coating is eminently resistant to various weather influences, such as rain, frost and UV radiation. Another great advantage of a protective coating according to the invention is that it can be removed in a manner that is not particularly labor-intensive nor requires chemicals that affect the environment unacceptably and/or constitute health hazards.

The protective coating according to the invention can be applied to surfaces of different materials. Preferably, the surface is a substantially transparent surface, such as an outside surface of a greenhouse, for instance a horticultural greenhouse. Typically, the surface will be made of glass or plastic. Conventionally used plastics are, for instance, polycarbonates, polyolefins, polyethylene terephthalate and polyesters.

As stated, the protective coating according to the invention comprises a pigment and a binder. Preferably, the pigment is present in an amount of 30-95% by weight, more preferably of 40-85% by weight, based on the weight of the protective coating. The binder is preferably present in an amount of 4-60% by weight, more preferably of 6-45% by weight, based on the weight of the protective coating. It has been found that a protective coating containing these components in these amounts has both optimum protective action and optimum adhesive strength.

As pigment, any substance can be used that can be suitably dispersed in a protective agent from which the protective coating according to the invention is formed, and which imparts to the coating the desired protective action against (solar) radiation. Preferably, a pigment is used which yields a white protective coating. Suitable pigments are selected from the group of calcium carbonate, titanium oxide, a silicate, such as magnesium or aluminum silicate, gypsum, baryte, and combinations thereof. Depending on the desired properties of the protective coating, the skilled person will be able to suitably select the pigment. Titanium oxide has a very high covering power, so that only a relatively small quantity thereof is needed. As a consequence, the ratio between binder and pigment is more favorable. When much binder with respect to the pigment can be used, the weather resistance of the protective coating is better. The advantage of the use of calcium carbonate is that a protective coating based thereon becomes slightly transparent in damp weather, so that the light intensity within a greenhouse adjusts itself to the weather conditions. Further, calcium carbonate is an economically attractive natural product and upon removal gives little, if any, visual or other contamination of the environment.

An important constituent of the protective coating according to the invention is the polymeric binder. This constituent should be selected such that a sufficient adhesion of the coating to a surface is obtained, while yet the coating can be easily removed at any desired time. According to the invention, as binder, a polymer is used which has a weight-average molecular weight of 10,000-100,000 and an acid value of 40-250.

The weight-average molecular weight of the binder should not be too low. A low weight-average molecular weight is normally indicative of short polymer chains, which will entail a poorer binding effect in the protective agent to be used. Moreover, the degradation of the binder under the influence of (UV) radiation has more effect when short chains are broken than when long chains are broken. Too high a weight-average molecular weight also entails disadvantages. Often, the viscosity of the protective agent will be too high when the chains of the binder are too long. The agent is then difficult to apply to a surface. It is preferred that the weight-average molecular weight of the polymeric binder lies between 15,000, preferably 20,000, and 75,000, preferably 50,000. The weight-average molecular weight can be suitably determined with gel permeation chromatography (GPC). This technique, which is known per se, can be carried out in this connection in a manner known to those skilled in the art, using, for instance, tetrahydrofuran as solvent and polystyrene as external standard.

Another requirement to be satisfied by the binder according to the invention is that it have an acid value of 40 to 250. The acid value is connected with the average number of free acid groups per chain of the polymeric binder. This value is preferably 60-160. The acid value can be determined by titration with potassium hydroxide, with the end point being determined potentiometrically. The acid value then corresponds to the number of milligrams of potassium hydroxide used in the titration per gram of the polymeric binder.

A polymer which, according to the invention, is suitable for use as binder in a protective agent preferably has a polydispersity of a value of 2 to 6, preferably of 3 to 5. The term 'polydispersity' used herein means the ratio between the weight-average and the number-average molecular weight ($M_w/M_n$). The number-average molecular weight, like the weight-average molecular weight, can be determined using GPC.

Preferably, the binder has a glass transition temperature between 10 and 60° C., with a particular preference for the range between 20 and 50° C. It has been found that a protective coating based on a polymer satisfying this requirement exhibits particularly suitable adhesion to a surface of a greenhouse. It has also been found that using, as a binder, a polymer having a glass transition temperature within the range mentioned yields a protective agent that has good handling properties and is easy to apply to form the protective coating.

As binder, both homopolymers and copolymers can be used. The nature of the monomers in the binder is of less importance than the parameters already mentioned.

The binder is preferably a vinyl polymer. The use of a vinyl polymer as binder yields an exceptionally suitable protective coating. Suitable monomers are, for instance, vinyl aromatic monomers, such as α-methylstyrene and styrene, acrylonitrile, methacrylonitrile, acrylamide, vinyl acetate, vinyl chloride, phenoxyethyl acrylate, multifunctional acrylates, such as hexanediol dimethyl acrylate, glycol dimethyl acrylate, divinyl benzene and esters of methacrylic acid or acrylic acid, or mixtures of these esters. Examples of suitable esters comprise alkyl esters, where the alkyl group can contain from 1 to 20 carbon atoms, alkoxy alkyl esters, such as butoxy ethyl acrylate and butoxy alkyl methacrylate, and hydroxy alkyl esters. An acrylic acid or methacrylic acid ester can account for up to 90% of the polymer. When acrylonitrile or acrylamide is present in the vinyl polymer, these monomers will typically be present in the polymer in an amount of less than 10 to 15% by weight. Styrene and vinyl acetate, respectively, may account for up to 30 and 50% by weight of the polymer. Other suitable monomers are acid monomers such as acrylic acid, methacrylic acid, maleic acid, fumaric acid, crotonic acid, itaconic acid, aconitic acid and semi-esters thereof, and maleic acid anhydride and the like. These acid monomers can be present in amounts of up to 50% by weight. Particularly suitable monomers are methyl methacrylate, butyl acrylate, 2-ethylhexyl acrylate, ethyl acrylate, styrene, methacrylic acid and acrylic acid.

Further, it is possible that the polymer is wholly or partly crosslinked. Eligible as crosslinking monomers are methylolacrylamide, methylolmethacrylamide and the like. These crosslinking monomers will typically account for not more than 5% by weight of the polymer.

In addition to a pigment, a weak base and a binder, a protective coating according to the invention can further comprise a few other components.

Thus, it is advantageous to include an adhesion promoter in the protective coating. The adhesion of the coating to a surface will be improved by the presence of an adhesion promoter, while the ease of removing the protective coating is hardly, if at all, affected. Depending on the material of the surface on which a protective coating is to be provided, the skilled person will be able to select a suitable adhesion promoter. Preferably, the adhesion promoter must be water-soluble and contain an amino group. For use on glass surfaces, it is recommended to use a silane, such as γ-aminopropyltriethoxy silane, γ-aminopropyltrimethoxy silane, γ-(methylamino)propyltrimethoxy silane, γ-aminopropylmethyldiethoxy silane, γ-(2-aminoethyl-3-aminopropyl) triethoxy silane and γ-(2-aminoethyl-3-aminopropyl) methyldimethoxy silane. An adhesion promoter will typically be present in the protective agent in an amount of 0.05 to 1% by weight, preferably from 0.1 to 0.3% by weight, based on the weight of the protective coating.

Another constituent yielding advantages is a pigment divider. The presence of such a substance prevents aggregation of pigment upon drying of the protective agent which has been applied in diluted form for forming the protective coating. A pigment divider can be present in amounts of from 0.1 to 0.5% by weight, based on the weight of the protective coating. The nature of the pigment divider depends on the nature of the pigment present in the protective coating. Thus, sodium hexametaphosphate is highly suitable when calcium carbonate is used as pigment. When titanium dioxide is used as pigment, for instance a polymeric multifunctional surfactant, such as Ser-Ad FA 607® (available from the firm of Hüls AG) can be used excellently as a pigment divider.

To optimize the viscosity of the protective agent for forming a protective coating according to the invention, a thickener can be included. The optimum viscosity of the protective agent depends on the method by which the coating is applied to a surface. If a surface is brushed with a protective agent, a higher viscosity will be desirable than when a surface is sprayed with a protective agent. Further, the viscosity must be sufficient to obtain a thick coating. On the basis of his common professional knowledge, the skilled person will be able to determine which viscosity is most suitable in any given case. Examples of thickeners comprise organic and inorganic thickeners, such as hydroxyethyl cellulose, magnesium aluminum silicate and combinations thereof. The amount of the thickener will be tuned to the desired viscosity and typically be between 1 and 5% by weight, based on the weight of the protective coating.

To be mentioned as other additional constituents of the protective coating are dispersants, detergents, antifoam agents, preserving agents and the like.

It will be clear that the invention also relates to a protective agent for forming a protective coating as described above. The protective agent will contain water, in addition to the protective coating constituents already mentioned. If the protective agent contains calcium carbonate as pigment, it will contain such an amount of water that the above-mentioned constituents of the protective coating in the ratios specified, are diluted 1.5-5 times. If titanium oxide is used as pigment, that dilution is a factor of 5-12 times. It is an advantage of the invention that no volatile organic solvents need to be used.

Preferably, there is also a weak base present in the protective agent according to the invention. It provides for neutralization of free acid groups present in one or more components of the agent. It has also been found that the presence of the weak base leads to improved film formation of the protective agent upon drying, when a protective coating is being formed. Preferably, the weak base is selected from the group of ammonia, mono- di- and trialkylamines, with the alkyl group containing from 1 to 8 carbon atoms. Particularly preferred is ammonia.

The weak base is preferably present in an amount of 0.2-5% by weight, more preferably of 0.4-3% by weight, based on the weight of the protective agent.

As stated, the application of the protective agent to form a protective coating can occur in different ways. Possible ways include spraying, brushing and the like. The protective action of the coating will be hardly, if at all, affected by the manner of application.

When in the course of time, for instance at the end of the season, the protective coating is to be removed, the coating according to the invention is treated with a removing agent, comprising a strong base and a complex former. The removing agent renders the binder in the protective coating water-soluble.

The strong base is preferably present in the removing agent in an amount of from 2 to 10% by weight, more preferably of from 2 to 5% by weight, based on the weight of the removing agent. Suitable strong bases are, for instance, alkali metal hydroxides such as sodium hydroxide, potassium hydroxide and lithium hydroxide. Preferably, sodium hydroxide is used.

Preferably present, in addition to the strong base, is a complex former, preferably in an amount of 2 to 10% by weight, based on the weight of the removing agent. It has been found that especially the use of the trisodium salt of nitrilotriacetic acid or the tetrasodium salt of ethylene diamine tetraacetic acid greatly promotes the protective coating becoming soluble. The use of trisodium salt of nitrilo-triacetic acid is preferred. This substance is properly and rapidly biodegradable.

Especially when a protective coating provided on a plastic is to be removed, it is found to be of great advantage to use a removing agent that further comprises an organic solvent. It is also possible to use an organic solvent separately, in addition to the removing agent. The latter option is advantageous in that the organic solvent used does not necessarily need to be alkali-resistant. A great many solvents are eligible for use as a separate component. Examples include benzyl alcohol, tetrahydrofuran, 1,4-dioxane, dimethyl sulfoxide, higher alcohols, such as butanol, pentanol, hexanol, cyclohexanol and isomers thereof, and cyclohexanone. The organic solvent effects a still easier removal of the protective coating.

It is preferred to use the organic solvent in the removing agent. This is beneficial in particular to the simplicity of the procedure of removing the protective coating. In that case, an alkali-resistant organic solvent should be used. The amount of organic solvent is preferably 10-30% by weight, more preferably 15-25% by weight, based on the weight of the removing agent. Particularly preferred is the use of benzyl alcohol. Benzyl alcohol is little volatile, little toxic to man and animals and hardly combustible, so that the health of those working with the removing agent is not put at risk. When benzyl alcohol ends up in the environment after the removal of the protective coating, this does not yield unacceptable contamination.

In addition to the constituents mentioned, the removing agent may further contain a thickener, such as xanthan gum. Xanthan gum renders the removing agent highly pseudoplastic, so that it is thin when being applied and thick after being applied. This property prevents the agent from flowing off the surface too fast. Further, the removing agent may contain a substance reducing the surface tension, or an emulsifier. For instance, the sodium salt of dodecylbenzenesulfonic acid is suitable.

To remove the protective coating, the coating is treated with the above-described removing agent. This treatment comprises suitably applying, as by spraying or pouring, the removing agent onto the coating to be removed. Typically, the removing agent is used in a 5 to 10-fold dilution. After application of the removing agent, the surface can be rinsed with water. It is also possible to allow the rain to wash things off. Thereafter, virtually all traces of the protective coating will be gone.

The invention will presently be further elucidated in and by the following examples.

EXAMPLE 1

Preparation of a Protective Agent

In a reaction vessel, the following substances were added to each other in the order specified:

|  | wt. % |
|---|---|
| water | 36.9 |
| alkyl ethoxylate (non-ionic surfactant) | 0.2 |
| antifoam agent | 0.3 |
| 30% solution of sodium hexametaphosphate | 0.6 |
| ammonia solution 25% | 1.5 |

-continued

|  | wt. % |
|---|---|
| polymer dispersion*) | 14.8 |
| finely divided calcium carbonate | 44 |

*)The polymer dispersion used had a solids content of 45% an an acid value of 73, calculated on the solids content. The polymer in the binder had been formed exclusively from acrylate monomers.

The mixture obtained was stirred for 20 minutes under high shear conditions.

Then the following substances were added, in succession:

| magnesium aluminum silicate | 0.8 |
|---|---|
| hydroxyethyl cellulose | 0.6 |
| preserving agent | 0.1 |
| 60% solution of γ-aminopropyltriethoxy silane | 0.2 |

Again, vigorous stirring was carried out, until a homogeneous product was formed.

*) The polymer dispersion used had a solids content of 45% And an acid value of 73, calculated on the solids content. The polymer in the binder had been formed exclusively from acrylate monomers.

Viscosity of end product at 20° C.:

20 Pa·sec (Brookfield 0.5 rpm, spindle 5)

Viscosity of dilution of use at 20° C. (1 part by weight of product diluted with 1.5 parts by weight of water):

20 mPa·sec (Brookfield 0.5 rpm, spindle 1)

EXAMPLE 2

Preparation of a Removing Agent

In a reaction vessel, the following substances were added to each other in the order specified:

|  | wt. % |
|---|---|
| water | 73 |
| Xanthan gum | 0.5 |

The mixture obtained was stirred at a moderate speed, until a thickening had occurred.

Then the following were added, in succession:

| sodium hydroxide solution 33% | 6.0 |
|---|---|
| solution of trisodium nitrilotriacetate 40% | 20 |
| 30% solution of an amphoteric surfactant | 0.5 |

Stirring was carried out until a homogeneous product was formed.

Viscosity of end product 20° C.:

30 Pa·sec (Brookfield 0.5 rpm, spindle 5)

Viscosity of dilution of use at 20° C. (1 part by weight of product diluted with five parts by weight of water):

40 mPa·sec (Brookfield 0.5 rpm, spindle 1)

EXAMPLE 3

Forming a Protective Coating

The protective agent of Example 1 was diluted with 1.5 parts by weight of water and applied to a glass horticultural greenhouse by spraying in the early spring. After six months, the protective coating formed was still fully intact.

EXAMPLE 4

Removing a Protective Coating

The removing agent of Example 2 was diluted, for use, with five parts by weight of water and applied to the protective coating of Example 3 by spraying in the autumn. After a few showers of rain, which had come down by the end of a few days, the protective coating was found to have been completely washed off by the rain.

EXAMPLE 5

Preparation of a protective Agent

In a reaction vessel, the following substances were added to each other in the order specified:

|  | wt. % |
|---|---|
| water | 6.0 |
| Ser-AD FA 607 ® (Hüls AG) | 0.3 |
| alkyl ethoxylate (non-ionic surfactant) | 0.3 |
| polymer dispersion*) | 3.0 |
| antifoam agent | 0.5 |
| titanium white | 20 |

The mixture obtained was dispersed with a high shear dissolver until the desired fineness was achieved.

Then the following were added, in succession:

| water | 31.3 |
|---|---|
| hydroxyethyl cellulose | 0.90 |

Stirring was performed until a homogeneous mixture was obtained. Then the following were added, in succession:

| ammonia solution 25% | 3.4 |
|---|---|
| polymer dispersion*) | 34 |
| preserving agent | 0.1 |
| 60% solution of γ-aminopropyltriethoxy silane | 0.2 |

*)The polymer dispersion used had a solids content of 45% an an acid value of 73, calculated on the solids content. The polymer in the binder had been formed exclusively from acrylate monomers.

Vigorous stirring was performed until a homogeneous product was formed.

*) The polymer dispersion used had a solids content of 45% And an acid value of 73, calculated on the solids content. The polymer in the binder had been formed exclusively from acrylate monomers.

Viscosity of end product at 20° C.:
10 Pa·sec (Brookfield 0.5 rpm, spindle 5)
Viscosity of dilution of use at 20° C. (1 part by weight of product diluted with four parts by weight of water):
15 mPa·sec (Brookfield 0.5 rpm, spindle 1)

EXAMPLE 6

Preparation of a Removing Agent

In a reaction vessel, the following substances were added to each other in the order specified:

|  | wt. % |
|---|---|
| water | 57.65 |
| Xanthan gum | 0.5 |

The mixture obtained was stirred at a moderate speed, until a thickening was achieved.
Then there were added, in succession:

| | |
|---|---|
| Dodecylbenzenesulfonic acid | 0.25 |
| sodium hydroxide solution 33% | 6.1 |
| solution of trisodium nitrilotriacetate 40% | 10 |
| benzyl alcohol | 25 |
| pine oil | 0.5 |

Stirring was performed until a homogeneous product was formed.
Viscosity of end product 20° C.:
10 Pa·sec (Brookfield 0.5 rpm, spindle 5)
Viscosity of dilution of use at 20° C. (1 part by weight of product diluted with five parts by weight of water):
20 mPa·sec (Brookfield 0.5 rpm, spindle 1)

EXAMPLE 7

Forming a Protective Coating

The protective agent of Example 5 was diluted with four parts by weight of water and applied to a plastic horticultural tunnel by spraying, in the early spring. After six months, the protective coating formed was still fully intact.

EXAMPLE 8

Removing a Protective Coating

The removing agent of Example 6 was diluted with five parts by weight of water and applied by spraying onto the protective coating of Example 7, in the autumn. After a short time of action, the protective coating was removed completely with a water jet.

The invention claimed is:

1. A greenhouse comprising: a substantially transparent surface; a protective coating comprising a pigment and a binder, the binder comprising a vinyl polymer based on one or more of the monomers selected from the group consisting of methyl methacrylate, butyl acrylate, 2-ethylhexyl acrylate, ethyl acrylate, styrene, methacrylic acid and acrylic acid, having a weight-average molecular weight of 10,000-100,000 and an acid value of 40-250, wherein the binder has a polydispersity of 2-6 and a glass transition temperature of 10 to 60° C., and wherein the protective coating is adhered to said substantially transparent surface and the protective coating is removable with a removing agent comprising a base and a complex former.

2. The greenhouse according to claim 1, wherein the binder of the protective coating has a weight-average molecular weight of 15,000 to 75,000.

3. The greenhouse according to claim 2, wherein the binder of the protective coating has a weight-average molecular weight of 20,000 to 50,000.

4. The greenhouse according to claim 1, wherein the acid value of the binder of the protective coating is between 60 and 160.

5. The greenhouse according to claim 1, wherein the glass transition temperature of the binder of the protective coating is between 20 and 50° C.

6. The greenhouse according to claim 1, wherein the binder of the protective coating is present in an amount of 4-60% by weight, based on the weight of the protective coating.

7. The greenhouse according to claim 1, wherein the pigment of the protective coating is selected from the group consisting of calcium carbonate, titanium oxide, a silicate, gypsum, barite, and combinations thereof.

8. The greenhouse according to claim 1, wherein the pigment of the protective coating is present in an amount of 30-95% by weight, based on the weight of the protective coating.

9. The greenhouse according to claim 1, wherein the protective coating further comprises an adhesion promoter.

10. The greenhouse according to claim 9, wherein the adhesion promoter is selected from the group of silanes.

11. The greenhouse according to claim 1, wherein the protective coating further comprises a pigment divider.

12. The greenhouse according to claim 1, wherein the protective coating further comprises a thickener.

13. A greenhouse comprising: a substantially transparent surface; a protective coating comprising a pigment and a binder, the binder comprising a vinyl polymer based on one or more of the monomers selected from the group consisting of methyl methacrylate, butyl acrylate, 2-ethylhexyl acrylate, ethyl acrylate, styrene, methacrylic acid and acrylic acid, having a weight-average molecular weight of 10,000-100,000 and an acid value of 40-250, wherein the binder has a polydispersity of 2-6 and a glass transition temperature of between about 10° C. to about 20° C., and wherein the protective coating is adhered to said substantially transparent surface and the protective coating is removable with a removing agent comprising a base and a complex former.

* * * * *